March 28, 1961  D. W. ROESE ET AL  2,976,715
DYNAMIC PRESSURE SIMULATOR
Filed Feb. 28, 1957  6 Sheets-Sheet 1

WITNESSES

INVENTORS
David W. Roese &
Arne P. Rasmussen
BY
ATTORNEY

March 28, 1961 D. W. ROESE ET AL 2,976,715
DYNAMIC PRESSURE SIMULATOR
Filed Feb. 28, 1957 6 Sheets-Sheet 6
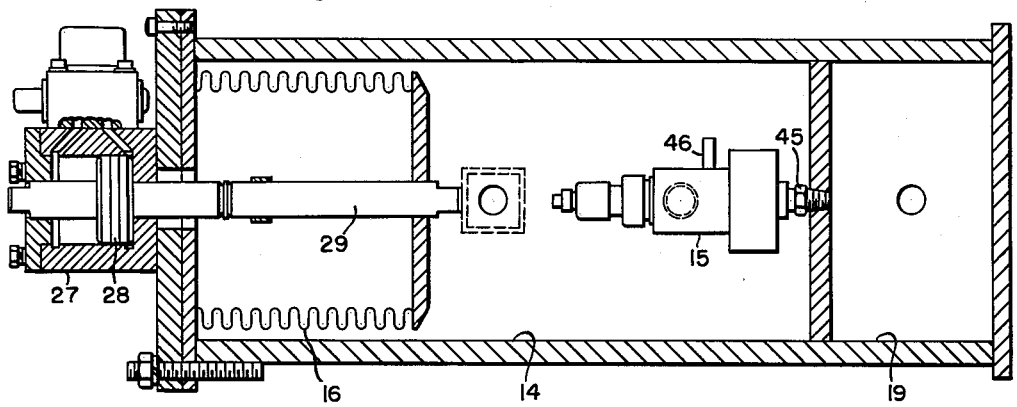
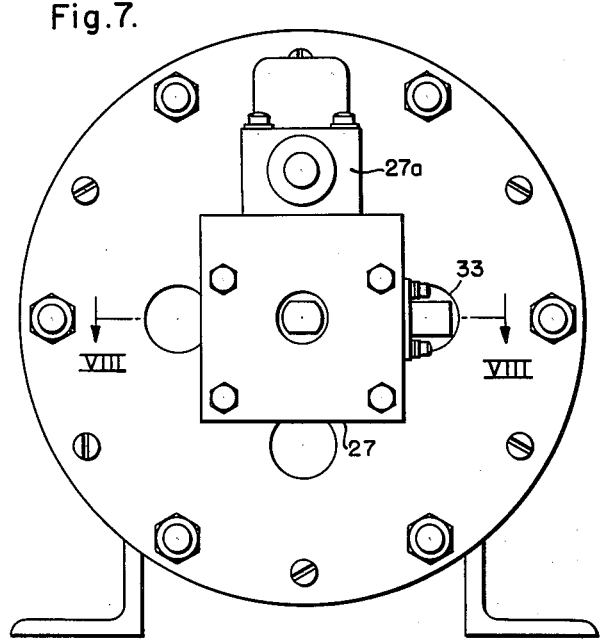
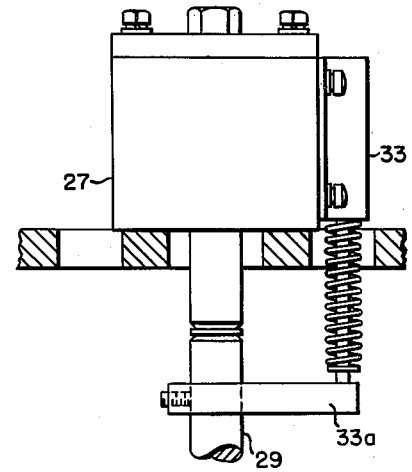
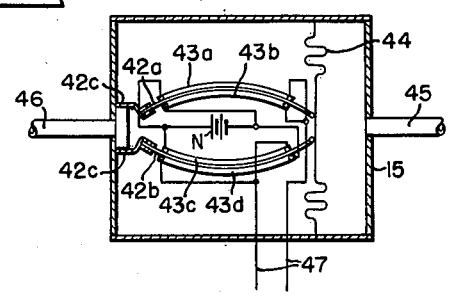

United States Patent Office 2,976,715
Patented Mar. 28, 1961

2,976,715

DYNAMIC PRESSURE SIMULATOR

David W. Roese, Catonsville, and Arne P. Rasmussen, Millersville, Md., assignors to Westinghouse Electric Corporation, East Pittsburgh, Pa., a corporation of Pennsylvania Filed Feb. 28, 1957, Ser. No. 643,032

5 Claims. (Cl. 73—4)

This invention relates to a dynamic pressure simulator and more particularly to a pressure simulator capable of simulating pressures above and below atmospheric pressures for the purpose of testing equipment.

Some previous pressure simulators have been of the static type of simulator in which pressures of the desired level are provided by evacuating the air from a pressure chamber. With this arrangement, however, no rapid change or dynamic pressures can be simulated for the purpose of providing necessary normal dynamic changes that would be encountered by equipment during normal operation.

It is, therefore, an object of this invention to provide a pressure simulator capable of providing accurate dynamic response.

It is another object to provide a pressure simulator capable of providing rapid dynamic response.

It is still another object of this invention to provide a pressure simulator not effected by minor pressure leaks in the simulator equipment.

Another object of this invention is to provide a pressure simulator not effected by ambient changes in temperature.

It is another object of this invention to provide a pressure simulator capable of simulating pressures above and below the surrounding atmospheric pressures.

It is another object of this invention to provide a pressure simulator capable of operating with uniform sensitivity over the full range of available pressures.

Other objects, purposes and characteristic features will become obvious as the description of the invention progresses.

In practicing this invention, there is provided a pressure chamber capable of being varied in pressure through the use of a vacuum or pressure pump as desired. The selected test pressure level within the pressure chamber is then provided with a dynamic control through the use of a variable volume dynamic pressure chamber capable of varying the pressure within the pressure chamber through a limited range. Volume or pressure variations within the variable volume or dynamic pressure chamber is accomplished through a control circuit and hydraulic actuator in response to input electrical commands. Changes within the dynamic pressure chamber are detected by a pressure sensitive transducer and used as a feedback to neutralize the incoming command signal. With this equipment, an instrument to be tested can be located within the pressure chamber, surrounded by the desired pressure level and subjected to dynamic changes in response to the pressures of the dynamic pressure chamber. The equipment being tested is, therefore, provided with the proper atmosphere for testing and with pressure changes simulating actual environment conditions.

Fig. 6 is a view partially cross sectioned showing the dynamic pressure change control of the pressure simulator.

Fig. 7 is an end view of the dynamic pressure control for the pressure simulator.

Fig. 8 is a view taken substantially along the line VIII—VIII of Fig. 7 showing the pressure feedback transducer control, and Fig. 9 is a view showing the details of a specific transducer structure.

In each of the several views similar parts bear like reference characters.

Figure 1:
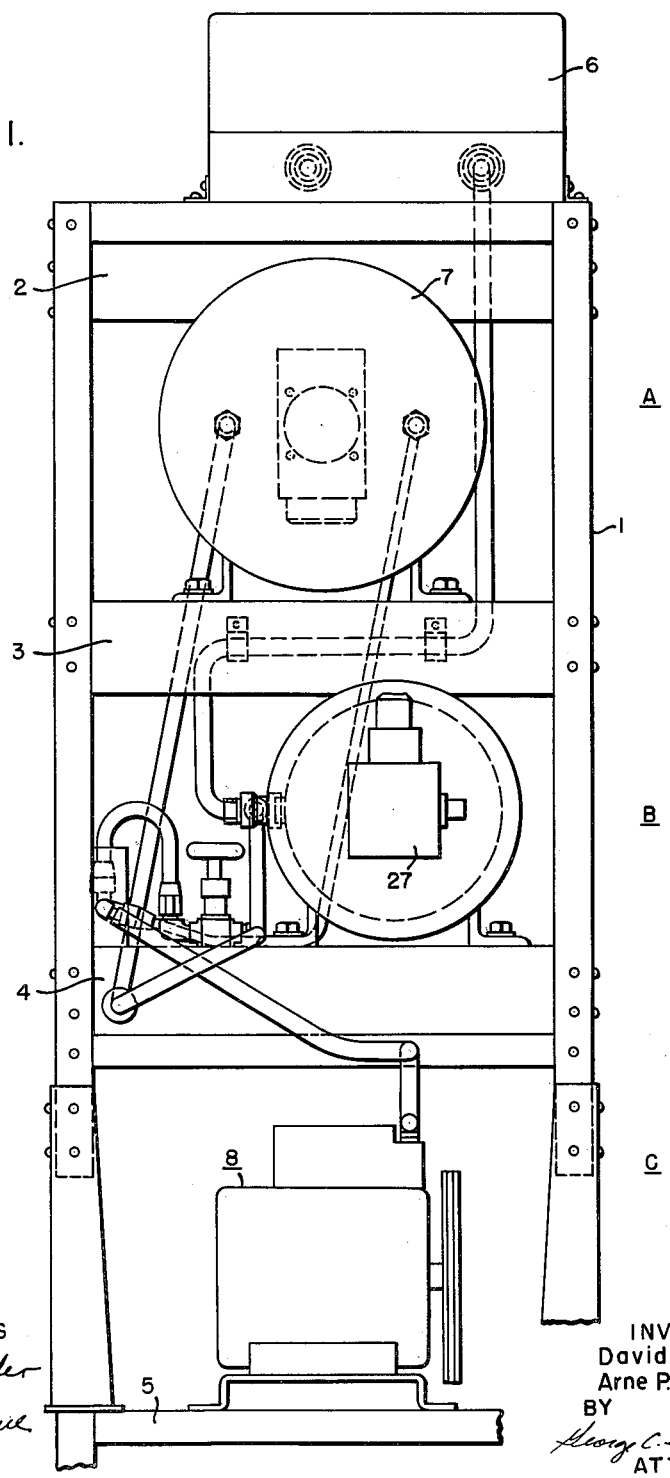
Figure 1 is an end elevational view of the pressure simulator positioned within a supporting stand.
Figure 2:
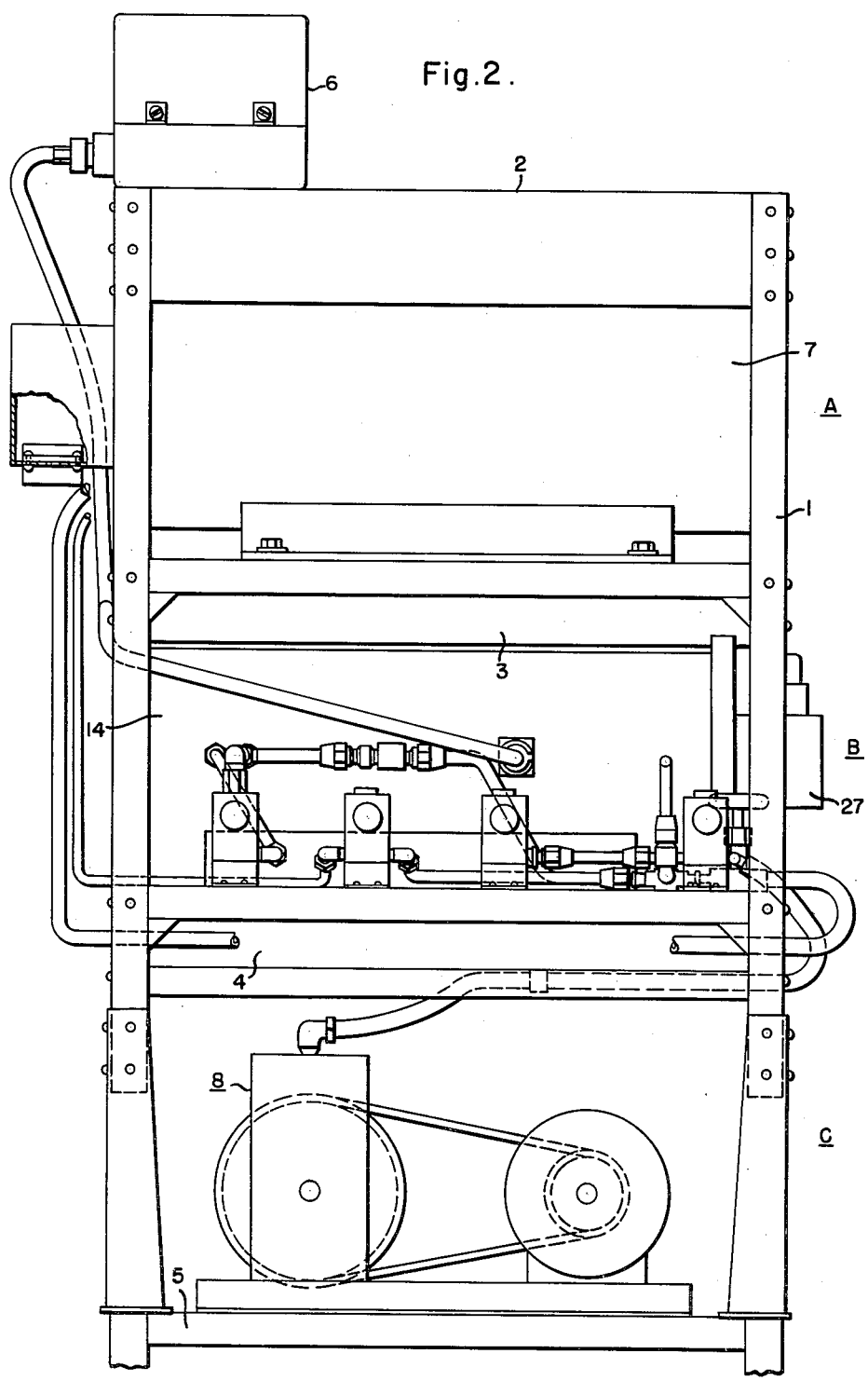
Fig. 2 is a side elevational view of the pressure simulator within the supporting stand.

The pressure simulator equipment shown in Figs. 1 and 2 can be divided into three major portions. These portions can be designated as portions A, B and C. The portion A is that portion of the simulator containing the pressure chamber necessary for providing the proper environment for equipment to be tested. The portion B is the control equipment necessary for providing dynamic changes within the pressure chamber of the portion A. The portion C represents the pump necessary for providing the desired pressures within the pressure chamber of the portion A as controlled by the dynamic control portion B.

The portions A, B and C are supported on a rack 1 comprising the shelves 2, 3, 4 and 5. The shelf 2 provides the rack necessary for electrical equipment such as amplifier 6 shown in place thereon for providing signal amplification for feedback control to be explained hereinafter. The shelf 3 of frame member 1 provides the support member for an environmental-pressure-simulation chamber in the form of the pressure chamber 7 used for housing the piece of equipment to be tested. The shelf 4 provides the support for the dynamic control portion B used to provide testing pressures within the pressure chamber 7 of the pressure simulator. The shelf 5 provides a support means for the source of fluid under pressure such as a pressure pump 8 necessary for providing operating pressures within the pressure simulator.

Figure 3:
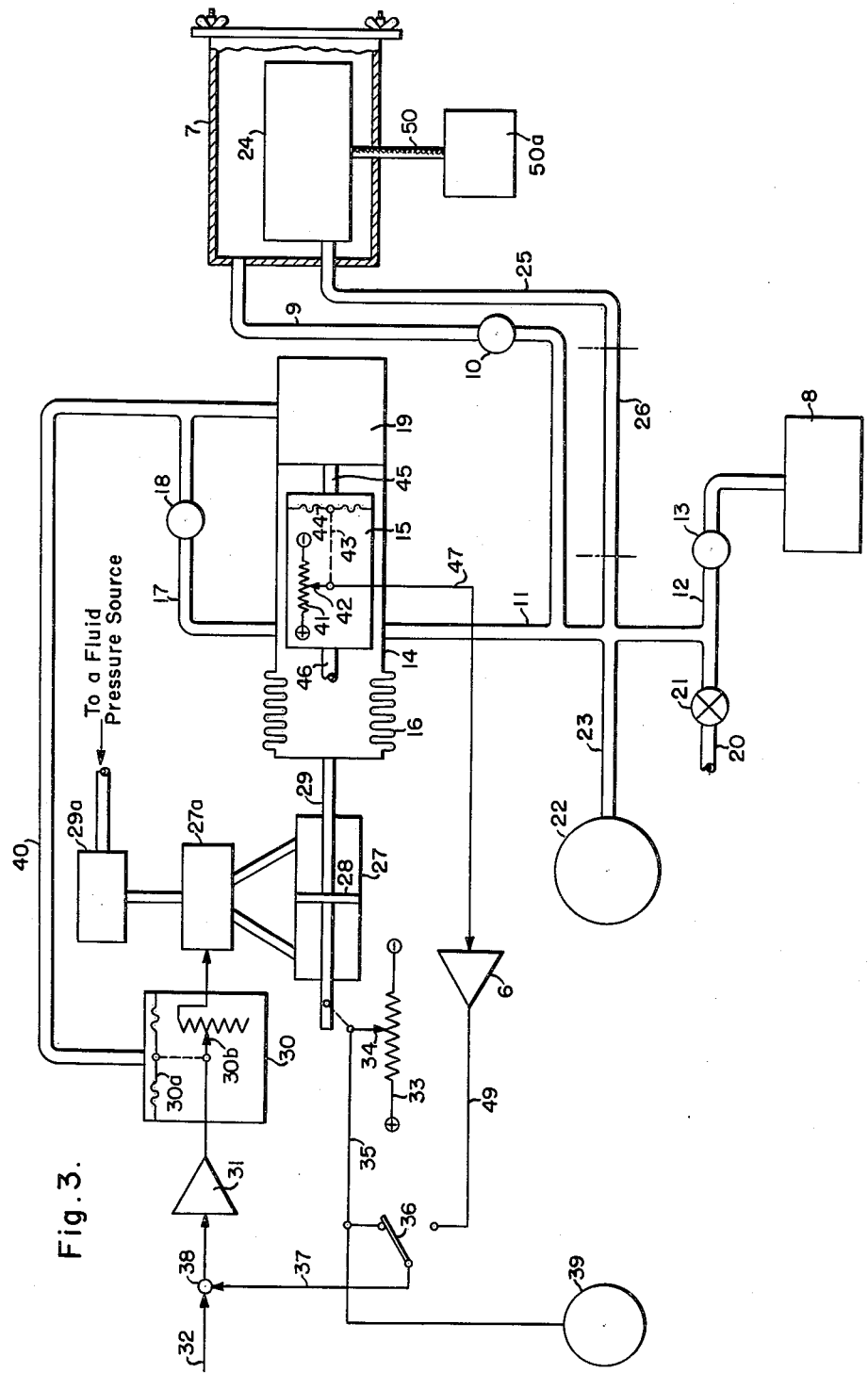
Fig. 3 is a diagrammatic showing of the pressure simulator during its operation of establishing a pressure level within the pressure chamber.
Figure 4:
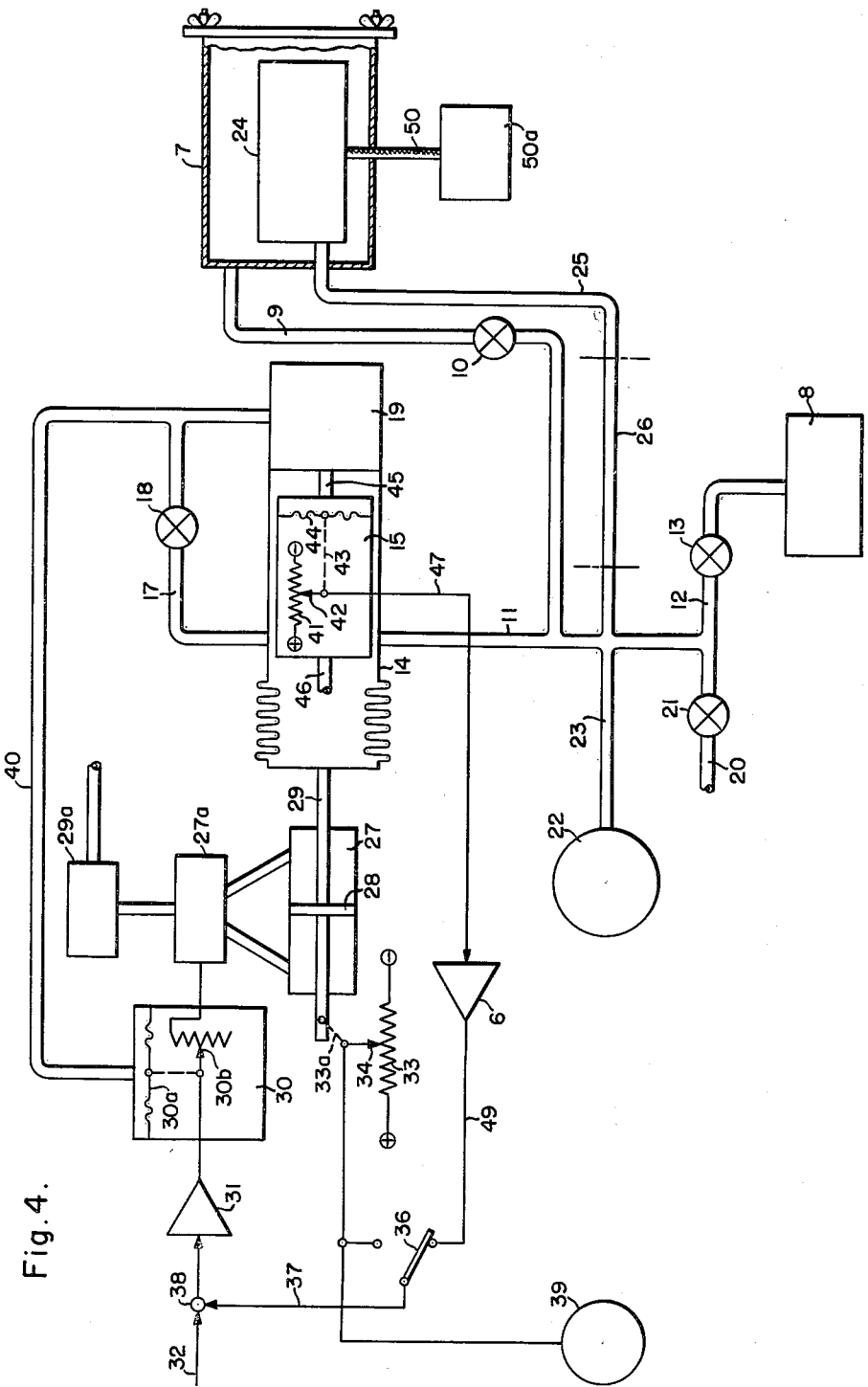
Fig. 4 is a diagrammatic showing of the pressure simulator during test periods with the equipment within the chamber at the desired pressure level.
Figure 5:
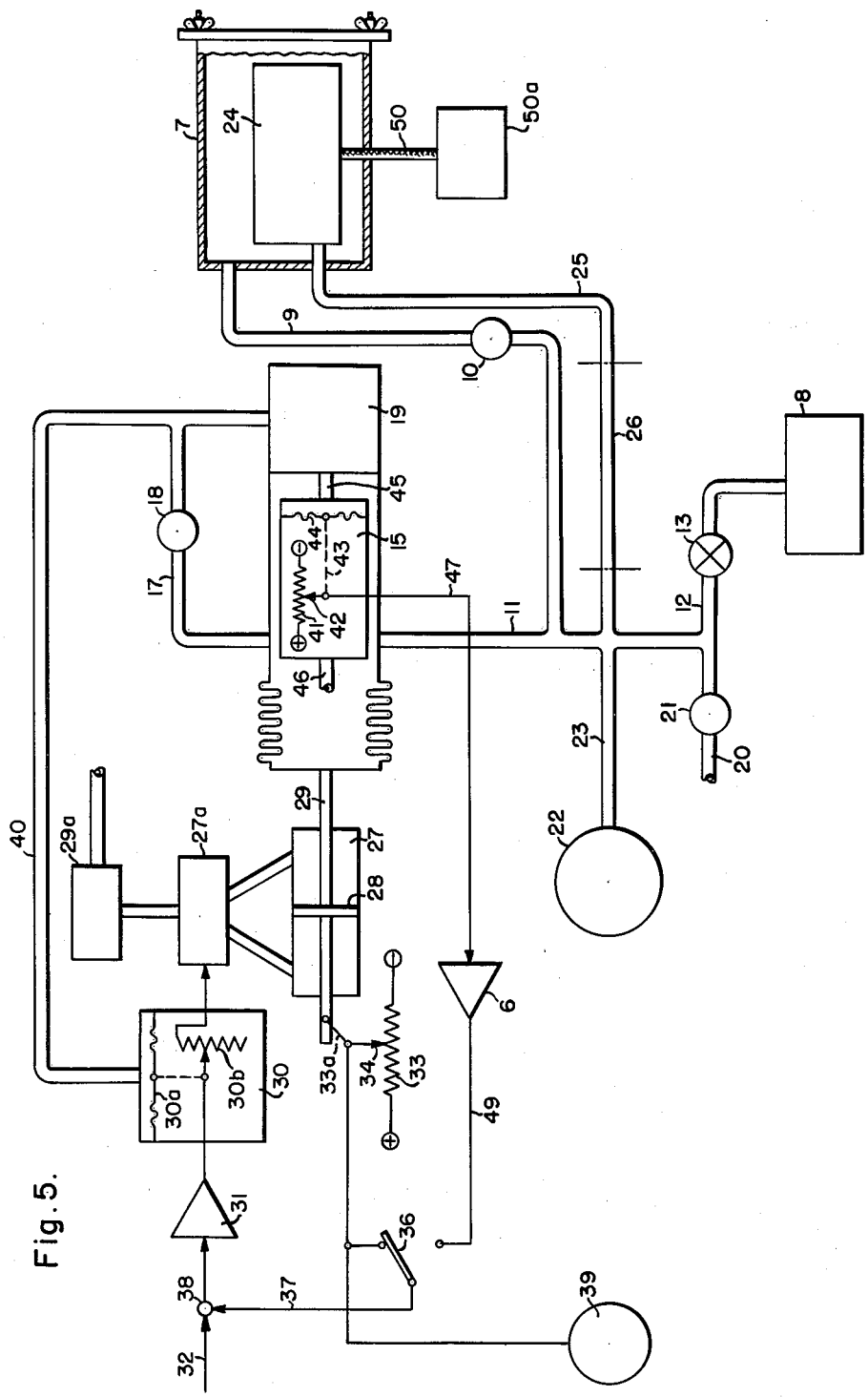
Fig. 5 is a diagrammatic showing of the pressure simulator during a period of returning the equipment to atmospheric pressure.

The pressure simulator is diagrammatically shown in Figs. 3, 4 and 5 and since these figures set forth the major parts of the simulator in their proper orientation a description of the parts and the mode of operation will now be set forth.

In Fig. 3, the pressure simulator equipment is set up for the pump operation or the mode of operation necessary to provide the proper pressure environment in the chamber 7 for the equipment to be tested. The pressure chamber 7 is connected through a pipe 9, valve 10 (in its open position) to the pipe 11, and pipe 12 through valve 13 to the pump 8 for providing a change in pressure within the chamber 7. The valves 10 and 13 in this mode of operation are necessarily open as shown in the drawing of Fig. 3. The pipe 11 is connected to the dynamic pressure chamber 14 containing a pressure sensitive transducer 15 and a control bellows 16. It can be seen that the pump 8 also provides a change of pressure within the dynamic pressure chamber with the change within the dynamic pressure chamber being the same as the pressure change within the pressure chamber 7. The dynamic pressure chamber is provided with a pipe 17 and valve 18 now in its open position for connecting the dynamic pressure chamber to a static pressure chamber 19. It, therefore, can be seen that the pressure within the static pressure chamber 19 is also varied by the pump 8 to be the same as the pressure within the dynamic pressure chamber.

The pump 8 is provided with an atmospheric exhausting pipe 20 which is at this time sealed by the closed valve 21. The system thus far described is provided with a pressure gauge 22 connected to the pipe 11 by the pipe 23. It can be seen that with the pump operating, pressures within each of the pressure chambers can be lowered or raised to a level below or above atmospheric pressure by an amount selected by the operator of the pressure control valves 10, 13, 18 and 21.

The equipment to be tested is represented by a block 24 shown within the chamber 7. The pipe 25 is connected to the pipe 11 for transmitting the controlled pressure from the chamber 14 to the equipment 24. The pressure pipe 25 has a section 26 indicated as the simulated pressure line for the purpose of retaining characteristics of actual pressure transmission to and from the equipment 24 to be tested which may take the form of various volumes and restrictions having pneumatic time lags.

During the period of pressure change by the pump 8 to establish an operating pressure level within the chamber 7, chamber 14, and equipment 24, it is desirable to maintain the bellows 16 of the dynamic pressure chamber 14 at a position approximately midway of its travel limits. Since the bellows 16 is operated through a hydraulic motor 27 provided with a piston 28 and bellows connected piston rod 29, it is only necessary to detect the position of the piston rod 29 and provide the fluid motor 27 with sufficient fluid to maintain the piston 28 at midstroke position. The hydraulic motor 27 is controlled through a hydraulic control valve 27a capable of responding to electrical input pulses delivered to the control valve 27a through a gain change device 30 and a typical amplifier 31. A suitable hydraulic control valve is shown in the copending application to W. B. Lloyd, Serial No. 599,157, filed July 20, 1956, now Patent No. 2,889,815 entitled Pressure Feedback Servo Valve and assigned to the common assignee. During times of pump mode operation as shown in Fig. 3, there is no command signal delivered to the pressure simulator through the incoming conductor 32. Thus, it is necessary to provide a closed loop system for introducing a control signal for maintaining the hydraulic motor piston 28 at midstroke position. This is accomplished through the use of a potentiometer 33 having a variable tap 34 mechanically secured to the hydraulic motor piston rod 29. With the potentiometer 33 connected across a source of power, not shown for the purpose of simplicity, the tap 34 would then present a take-off voltage, the amount of which is varied by the position of the piston rod 29 of the fluid actuator 27. This take-off voltage is fed through a conductor 35, operating mode control switch 36 in the first of its two extreme positions, and a conductor 37 to a junction point 38 with the command conductor 32, and to the input of the amplifier 31. If we assume that the relationship of the parts of this circuit are such that when the tap 34 is in its center position, the hydraulic motor piston 28 is also in its center position, and the closed loop is desirably stable. However, as the pump 8 provides pressure changes within the dynamic pressure chamber 14, the bellows 16 in turn provides a position change of the hydraulic motor piston 28 and this in turn provides a change in the position of the tap 34 on the potentiometer 33. The resultant change in signal output on the tap 34 of the potentiometer 33 is then fed to the amplifier 31 which in turn controls the control valve 27a to reposition the piston 28 of the hydraulic actuator 27 in a direction toward its midstroke. As the piston moves toward its midstroke, it in turn moves the tap 34 reducing the correction signal introduced by the potentiometer 33. As the piston 28 returns to its midstroke position, the closed loop system then stops retaining the piston 28 at its midstroke position.

The position of the piston 28 is indicated by the bellows position indicator 39 which is responsive to the tap 34 of the potentiometer 33. An operator of this equipment can then tell the exact position of the bellows 16 at a glance of the position indicator 39.

Operation of the closed loop system for maintaining the piston 28 at its mid-point position throughout the operation of the pump 8 will continue until the operator closes the valve 13 at the pressure level desired. At this time, the closed loop system becomes inactive or only sufficiently active to continue to hold the piston 28 at its mid-point position.

The gain change device is a pressure responsive transducer connected to the static pressure chamber 19 through the pipe 40 and comprises a bellows 30a and variable resistance 30b. As will be explained hereinafter, the purpose of the gain change device is to cause the control piston 28 to have linear response throughout the range of possible operating pressures.

Fig. 4 discloses the pressure simulator in its operating mode, that is the mode of operation in which dynamic pressures are applied to the equipment 24 being tested. Since under operating mode conditions the pressure in the chamber 7 is desirably established at the pump mode level, the valves 10, 21 and 13 are moved to their closed positions and maintained in their closed positions. This then prevents any leakage of pressure from the pressure chamber 7 back through the pump or out through the pipes to atmosphere.

At the same time the valve 18 between the dynamic pressure chamber 14 and the static pressure chamber 19 is closed thus establishing the desired operating pressure level within the static pressure chamber 19. The static pressure chamber now becomes a reference pressure chamber utilized in the control of the dynamic pressure chamber in response to incoming command signals on the conductor 32.

In order to use the static pressure chamber as a reference chamber, the dynamic pressure change transducer 15 is situated within the zone of the dynamic pressure chamber 14. The transducer 15 may take the form of any suitable device such as a potentiometer or a strain gauge resistance bridge. The transducer shown in Figures 3 through 6 uses a diaphragm controlled potentiometer 41. The potentiometer 41 is provided with a variable tap 42 mechanically connected by the link 43 to a diaphragm 44 that is exposed through the pipe 45 to static reference pressure on one side and exposed through the pipe 46 to the dynamic pressure within the dynamic chamber 14 on the other side. It, therefore, can be seen that any fluctuation within the dynamic pressure chamber 14 causes a fluctuation or variation of the diaphragm 44 which results in an electrical impulse signal appearing at the tap 42 of the potentiometer 41. The tap 42 is then electrically connected through the conductor 47 to a typical amplifier 6 which, in turn, is connected to the mode of operation of switch 36 in its second extreme position by the conductor 49.

The strain gauge bridge transducer shown in Fig. 9 is provided with a pair of oppositely bowed resilient leaf spring members 42a and 42b placed under compression between the securing support 42c and the diaphragm 44. The resilient leaf spring member 42a has secured on opposite sides thereof resistance strain gauges 43a and 43b respectively. Similarly, the resilient leaf spring member 42b has secured on opposite sides thereof resistance strain gauges 43c and 43d, respectively. It can be seen that movement of the diaphragm 44 causing more or less bowing of the leaf spring members 42a and 42b causes a change in resistance of each of the strain gauges 43a, 43b, 43c and 43d. The strain gauges 43a and 43d vary their resistances in the same direction and 43b and 43c vary their resistances in the same direction but opposite to the strain gauges 43a and 43d.

The four strain gauges are connected together to form a Wheatstone bridge circuit with a typical source N connected across two of the Wheatstone bridge terminals and the members of conductor 47 connected across the other two terminals.

With the parts of the pressure simulator now described in their proper orientation and with the pump mode already previously described, the operating mode used to test the desired piece of equipment will now be described. If we assume that the piece of equipment 24 desired to be tested is a piece of equipment that is normally subjected to minor pressure variations introduced therein during normal operation, then the mode of operation involving dynamic changes will be as follows. With the equipment in the pressure zone of a selected level and with electrical connections 50 to the equipment through the side wall of the pressure chamber 7 for purposes of indicating action of the equipment 24 on test instrument 50a, a command signal for dynamic change in the pressure is introduced by the conductor 32 to the junction point 38. The command signal is amplified by the amplifier 31 and passed through the gain change transducer 30 and used to provide the control of the control valve 27a. The control valve then ports oil to the hydraulic actuator 27 causing displacement of the piston 28 from its mid-point position. The control valve 27a is provided with a fluid flow limiter 29a for limiting velocity of piston 28 to a safe change in pressure at equipment 24. If we assume the polarity of the command signal on the conductor 32 is in a direction to cause the piston 28 to move toward the right, the bellows 16 is then compressed causing a reduction in the volume of the pressure chamber 14 and a resultant rise in pressure in the chamber 14. The rise of pressure within the chamber 14 is then delivered through the pipe 11 and pipes 25 and 26 to the equipment 24 being tested. The dynamic changes occurring in the equipment 24 being tested are then recorded on the test instruments 50a.

At the same time, the pressure change within the dynamic chamber 14 causes a deflection of the diaphragm 44 to the right, as viewed in Fig. 4, since the pressure within the dynamic pressure chamber rises above the static pressure 19. Movement of the diaphragm 44 causes a displacement of the tap 42 on the potentiometer 41 resulting in a feedback signal being applied to the conductor 47 which delivers the signal to the amplifier 6 for amplification. The output of the amplifier 6 is then fed through the conductor 49 and the mode change switch 36, now positioned in its lower or second extreme position, to the conductor 37 and junction point 38. The feedback signal resulting from the transducer 15 is of opposite polarity to the command signal being delivered to the conductor 32. With displacement of the diaphragm 44 of the transducer 15 being directly proportional to the displacement of the piston 28 in response to the incoming command signal on the conductor 32, it follows that the feedback signal from the transducer 15 is of adequate size or amplitude to neutralize the incoming command signal and stabilize the dynamic pressure chamber at the level selected by the incoming command signal of the conductor 32. Any change in the signal introduced on the conductor 32 resulting in a change in the position of the bellows 16 would again cause the transducer 15 to provide an equal and opposite signal to the selected incoming signal on the conductor 32.

It is pointed out that the signal introduced on the conductor 32 may be introduced through a manually controlled means or may be introduced through the use of an analog computer. In most instances, the analog computer system is used to provide control signals on the conductor 32. The method of signal introduction, however, does not form a part of this invention.

At the end of a test cycle for the equipment 24, the pressure simulator is again returned to atmospheric pressure and this mode is shown in Fig. 5. To return the pressure to atmospheric pressure level, it is necessary to open the valves 10, 18 and 21 allowing pressure differences within the pressure chamber 7, the static pressure chamber 19 and the dynamic pressure chamber 14 to bleed in or out through the valve 21 to atmosphere. During this period, the valve 13 is closed to prevent pump pressures from being introduced into the pipe 11. The mode selecting switch 36 is also moved to its first or opposite extreme position allowing the potentiometer 33 to provide signals to the junction point 38 for maintaining the piston 28 in its mid-point position during the pressure change in the dynamic pressure chamber 14.

Fig. 6 of the drawing discloses a typical arrangement of the dynamic chamber 14, static pressure chamber 19, transducer 15, bellows 16 and hydraulic actuator 27. From this view, it is clear that the transducer 15 is positioned completely within the dynamic pressure chamber 14. With this arrangement, a slight leak occurring within the transducer housing 15 will have little or no effect on the end results of the pressure simulator in testing the piece of equipment indicated by the block 24. This situation exists due to the fact that any leakage within the transducer 15 occurs within the dynamic pressure chamber 14 and such a change will be detected by the transducer 15 to provide a feedback signal. This signal passes through the amplifier 6 and junction point 38 to the hydraulic control valve 27a for again readjusting the pressure within the dynamic pressure chamber to the selected value of the incoming signal. If the transducer 15 had been located within the static pressure chamber 19, a transducer leak would not have been detected and returned to the proper pressure level since the reference pressure of the static pressure chamber would be changed to a value different from the pressure in the test chamber 7. The result of this action would then be a change of pressure within the test chamber 7 to a value other than a value requested by the operator through the control of the pressure control valves 10, 13, 18 and 21.

Although the transducer 15 is shown and described as being within the dynamic chamber 14, it is pointed out that the transducer 15 may be located within the static chamber or any other convenient location, as long as pressure connections are provided to both chambers.

Fig. 7 shows the actual position of the hydraulic actuator 27 on the end of the dynamic pressure chamber 14. This figure also discloses the actual position of the potentiometer 33 as being secured to a body portion of the actuator 27.

Fig. 8 shows the mechanical linkage necessary for operating the transducer 33 from the piston rod 29 of the hydraulic actuator 27.

Since certain changes may be made in the above-described construction and different embodiments of the invention may be made without departing from the spirit and scope thereof, it is intended that all the matter contained in the above description and shown in the accompanying drawings shall be considered as illustrative and not in a limiting sense.

What is claimed is:

1. A dynamic pressure simulator comprising an environmental-pressure-simulation chamber for enclosing fluid pressure responsive equipment to be tested for reaction to changes in environmental pressure conditions, a source of fluid under pressure for providing steady state pressures in said environmental-pressure-simulation chamber, a dynamic pressure change means, conduit means for establishing fluid pressure communication from said dynamic pressure change means to the fluid pressure responsive equipment to be tested, actuating means operatively connected to said dynamic pressure change means to effect changes in dynamic pressure in said conduit means, control means for selectively controlling said actuating means, and feedback means responsive to a comparison of said dynamic pressure and said steady state pressure for neutralizing the effect of said control means upon equality with an input thereto.

2. A dynamic pressure simulator comprising an environmental-pressure-simulation chamber for enclosing fluid pressure responsive equipment to be tested for reaction to changes in environmental pressure conditions, a reference pressure chamber, means for providing corresponding steady state pressures in the environmental-pressure-simulation and reference pressure chambers, a dynamic pressure change means, conduit means for fluid pressure communication from said dynamic pressure change means to the fluid pressure responsive equipment to be tested, actuating means operatively connected to said dynamic pressure change means to effect changes in dynamic pressure in said conduit means, control means for selectively controlling said actuating means, feedback means responsive to a differential between the steady state pressure in said reference pressure chamber and said dynamic pressure for neutralizing the effect of said control means upon equality with an input thereto, and gain change means responsive to the pressure in said reference pressure chamber to alter the input to said control means for providing linear response of said actuating means throughout a range of steady state pressures.

3. A dynamic pressure simulator comprising a pressure controlled main chamber for enclosing fluid pressure responsive equipment to be tested for reaction to changes in environmental pressure conditions, means for establishing different static pressures in said main chamber, fluid pressure conduit means for connection to said fluid pressure responsive equipment to be tested, a dynamic pressure change means including a variable volume chamber means having a fluid pressure connection to said conduit means, a reference pressure chamber associated with said variable volume chamber means for storing fluid at a static pressure level corresponding to that in said main chamber, actuating means for said variable volume chamber means for causing volume changes and thereby dynamic pressure changes therein, control means for selectively controlling said actuating means, and transducer means responsive to a differential in pressures between that in said variable volume chamber means and in said reference pressure chamber to provide an output for neutralizing the effects of said control means on said variable volume chamber means in accordance with the action of said dynamic pressure change means.

4. The combination as set forth in claim 3 wherein said variable volume chamber means includes a bellows actuated by said actuating means for effecting the aforesaid volume and dynamic pressure changes.

5. The combination as set forth in claim 3 wherein said transducer means includes a diaphragm subject opposingly to the two pressures to which such transducer means responds, and a strain gauge bridge means operable by said diaphragm for producing the specified neutralizing effect.

References Cited in the file of this patent
UNITED STATES PATENTS

| | | |
|---|---|---|
| 2,422,702 | Rodanet | June 24, 1947 |
| 2,692,546 | Fischer et al. | Oct. 26, 1954 |
| 2,818,726 | Armonette et al. | Jan. 7, 1958 |